US012023584B2

(12) United States Patent
Nakagawa et al.

(10) Patent No.: US 12,023,584 B2
(45) Date of Patent: Jul. 2, 2024

(54) INFORMATION PROCESSING APPARATUS AND INFORMATION PROCESSING METHOD FOR SETTING VIBRATION STRENGTH FOR EACH TYPE OF A SOUND OUTPUT SECTION

(71) Applicant: SONY CORPORATION, Tokyo (JP)

(72) Inventors: Ayumi Nakagawa, Kanagawa (JP); Yusuke Nakagawa, Kanagawa (JP); Ikuo Yamano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/610,343

(22) PCT Filed: May 10, 2018

(86) PCT No.: PCT/JP2018/018048
§ 371 (c)(1),
(2) Date: Nov. 1, 2019

(87) PCT Pub. No.: WO2018/216480
PCT Pub. Date: Nov. 29, 2018

(65) Prior Publication Data
US 2020/0086215 A1 Mar. 19, 2020

(30) Foreign Application Priority Data

May 22, 2017 (JP) ................. 2017-101119

(51) Int. Cl.
*A63F 13/54* (2014.01)
*A63F 13/285* (2014.01)
*A63F 13/211* (2014.01)
(52) U.S. Cl.
CPC ............ *A63F 13/54* (2014.09); *A63F 13/285* (2014.09); *A63F 13/211* (2014.09)

(58) Field of Classification Search
CPC ...... A63F 13/54; A63F 13/285; A63F 13/211; G06F 3/01
(Continued)

(56) References Cited

U.S. PATENT DOCUMENTS 5,897,437 A * 4/1999 Nishiumi ............... G06F 3/011
463/47
9,788,101 B2 * 10/2017 Chizi ............... G10K 11/17837
(Continued)

FOREIGN PATENT DOCUMENTS

EP 3147757 A1 3/2017
JP 2003169125 A * 6/2003
(Continued)

OTHER PUBLICATIONS

International Search Report and Written Opinion of PCT Application No. PCT/JP2018/018048, dated Aug. 7, 2018, 11 pages of ISRWO.

(Continued)

*Primary Examiner* — Robert P Bullington
*Assistant Examiner* — Stephen Alvesteffer
(74) *Attorney, Agent, or Firm* — Hopeton Walker

(57) ABSTRACT

[Object] To provide a technology that enhances a user experience by appropriately setting vibration strength for each type of a sound output section. [Solving Means] An information processing apparatus according to the present technology includes a control section. The control section determines a type of a sound output section outputting a sound and changes vibration strength of a vibration section in accordance with the determined type of the sound output section.

14 Claims, 11 Drawing Sheets

(58) Field of Classification Search
USPC .......................................................... 463/35
See application file for complete search history.

(56) References Cited

U.S. PATENT DOCUMENTS

| | | | |
|---|---|---|---|
| 2001/0012802 A1* | 8/2001 | Nishiumi | G06T 15/20 463/36 |
| 2004/0029637 A1* | 2/2004 | Hein, Jr. | H03G 3/32 463/35 |
| 2007/0257530 A1* | 11/2007 | Florez | A47C 15/004 297/217.3 |
| 2008/0254837 A1* | 10/2008 | Klinghult | H04M 1/72481 455/566 |
| 2009/0322695 A1 | 12/2009 | Cho | |
| 2010/0148942 A1* | 6/2010 | Oh | G10L 25/48 340/407.1 |
| 2013/0113715 A1* | 5/2013 | Grant | G06F 3/04886 345/173 |
| 2013/0331067 A1* | 12/2013 | Coussemaeker | H04M 1/72454 455/412.2 |
| 2014/0119569 A1 | 5/2014 | Peeler et al. | |
| 2015/0301604 A1* | 10/2015 | Cho | G06F 3/04845 715/702 |
| 2015/0356838 A1* | 12/2015 | Obana | G06F 3/011 340/407.1 |
| 2016/0012687 A1 | 1/2016 | Obana | |
| 2016/0034057 A1 | 2/2016 | Ikeda et al. | |
| 2016/0080682 A1* | 3/2016 | Diaz | G11B 27/10 386/227 |
| 2016/0192067 A1* | 6/2016 | Obana | A63F 13/92 381/334 |
| 2016/0217779 A1 | 7/2016 | Peeler et al. | |
| 2016/0371813 A1* | 12/2016 | Fujie | G06T 3/40 |
| 2017/0003934 A1* | 1/2017 | Lee | G06F 3/011 |
| 2017/0092084 A1* | 3/2017 | Rihn | G06F 3/167 |
| 2017/0154506 A1 | 6/2017 | Obana et al. | |
| 2018/0028910 A1* | 2/2018 | Aoki | A63F 13/50 |
| 2018/0061195 A1 | 3/2018 | Rihn et al. | |
| 2018/0084195 A1* | 3/2018 | Yang | G01N 29/46 |
| 2018/0193757 A1* | 7/2018 | Kyuma | A63F 13/323 |
| 2019/0361714 A1* | 11/2019 | Rothkopf | G06F 1/1684 |
| 2020/0230647 A1* | 7/2020 | Shim | B06B 1/02 |

FOREIGN PATENT DOCUMENTS

| | | | |
|---|---|---|---|
| JP | 2004-129120 | A | 4/2004 |
| JP | 20040129120 | A | 4/2004 |
| JP | 2006-034791 | A | 2/2006 |
| JP | 20060034791 | A | 2/2006 |
| JP | 2013-242807 | A | 12/2013 |
| JP | 20130242807 | A | 12/2013 |
| JP | 2015-232786 | A | 12/2015 |
| JP | 20150232786 | A | 12/2015 |
| JP | 2016-126422 | A | 7/2016 |
| JP | 2016126422 | A | 7/2016 |
| JP | 2017-062788 | A | 3/2017 |
| JP | 20170062788 | A | 3/2017 |
| WO | 2013/175778 | A1 | 11/2013 |
| WO | 2016/186041 | A1 | 11/2016 |
| WO | 2016186041 | A1 | 11/2016 |

OTHER PUBLICATIONS

Office Action dated Apr. 19, 2022 in JP application 2019-519558, pp. 5, machine translation pp. 8.

* cited by examiner

Magnitude of sound 0

Magnitude of sound 50

Magnitude of sound 100(MAX)

INFORMATION PROCESSING APPARATUS AND INFORMATION PROCESSING METHOD FOR SETTING VIBRATION STRENGTH FOR EACH TYPE OF A SOUND OUTPUT SECTION

TECHNICAL FIELD

The present technology relates to a technology of controlling vibration strength and the like.

BACKGROUND ART

In recent years, a vibration section such as an eccentric motor is generally mounted to a game controller. The controller is configured to be vibrated at a predetermined timing (for example, see Patent Literature 1 below).

For example, in a case where an ally character is attacked by an enemy in a video of a game, the controller is vibrated along with such timing. By vibrating the controller along with the video of the game, a user experience can be enhanced as compared with the case that only the video is shown.

CITATION LIST

Patent Literature

Patent Literature 1: Japanese Patent Application Laid-open No. 2009-037582

DISCLOSURE OF INVENTION

Technical Problem

A game sound is output from a sound output section such as a speaker and a headphone. Sound strength is different for each type of the sound output section. On the other hand, the vibration strength of the controller is regarded as the same irrespective of the type of the sound output section. In this case, there is a problem that the user experience is degraded.

The present technology is made in view of the above-mentioned circumstances, and it is an object of the present technology to provide a technology that enhances the user experience by appropriately setting the vibration strength for each type of the sound output section.

Solution to Problem

In order to achieve the object, an information processing apparatus according to the present technology includes a control section. The control section determines a type of a sound output section outputting a sound and changes vibration strength of a vibration section in accordance with the determined type of the sound output section.

With this, the vibration strength can be appropriately set for each type of the sound output section. As a result, a user experience can be enhanced.

In the information processing apparatus, the control section may change the vibration strength of the vibration section in accordance with strength of the sound output from the sound output section. In this case, the control section may change the vibration strength such that the stronger the sound strength is, the stronger the vibration strength is or the weaker the sound strength is, or the weaker the vibration strength is. Alternatively, the control section may change the vibration strength such that the stronger the sound strength is, the weaker the vibration strength is or the weaker the sound strength is, the stronger the vibration strength is.

In the information processing apparatus, the control section may change strength of the sound output from the sound output section in accordance with the vibration strength of the vibration section.

With this, it is possible to appropriately change the sound strength in accordance with the vibration strength.

In the information processing apparatus, the control section may change the strength of the sound output from the sound output section in accordance with the changed vibration strength.

In the information processing apparatus, the control section may change the sound strength when the changed vibration strength reaches a maximum value of vibration.

With this, the vibration strength felt by a user can be pseudo-strong.

In the information processing apparatus, the control section may change the vibration strength of the vibration section in accordance with sound strength of an environmental sound.

With this, it is possible to appropriately change the vibration strength in accordance with the strength of the environmental sound.

In the information processing apparatus, the control section may change strength of the sound output from the sound output section in accordance with sound strength of an environmental sound.

With this, it is possible to appropriately change the sound strength in accordance with the strength of the environmental sound.

In the information processing apparatus, the control section may changes a video in accordance with vibration of the vibration section.

With this, it is possible to appropriately change the video in accordance with the vibration.

In the information processing apparatus, the control section may change a size of an object or a magnitude of an action of the object within the video in accordance with the vibration of the vibration section.

In the information processing apparatus, the control section may change a scene of a video in accordance with vibration of the vibration section.

With this, it is possible to appropriately change the scene of the video in accordance with the vibration.

In the information processing apparatus, the control section may change vibration of the vibration section in accordance with a scene of a video.

With this, it is possible to appropriately change the vibration in accordance with the scene of the video.

In the information processing apparatus, a microphone used for collecting a voice of a user may vibrate in accordance with vibration of the vibration section, and the control section may change the vibration strength in accordance with whether or not the microphone is used.

With this, it is possible to appropriately change the vibration strength in accordance with whether or not the microphone is used.

In the information processing apparatus, the control section may acquire information about a physical change of a user based on vibration of the vibration section and may change a value for changing the vibration strength in accordance with the physical change of the user.

With this, it is possible to appropriately change the vibration strength in accordance with the physical change of the user.

In the information processing apparatus, the control section may change strength of a vibration sound generated by vibration of the vibration section in accordance with strength of the sound output from the sound output section.

With this, it is possible to appropriately change the strength of the vibration sound in accordance with the sound strength.

In the information processing apparatus, the vibration section may be arranged on a vibrator, and the control section may acquire information about a state that the vibrator is held by a user and changes the vibration strength of the vibration section in accordance with the information about the state that the vibrator is held.

With this, it is possible to appropriately change the strength of the vibration sound in accordance with the state that the vibrator is held.

In the information processing apparatus, the control section may acquire sensitivity information about strength of the sound output from the sound output section or sensitivity of the vibration strength of the vibration section and may change the vibration strength of the vibration section in accordance with the sensitivity information.

With this, it is possible to appropriately change the vibration strength in accordance with the sensitivity.

An information processing method according to the present technology includes determining a type of a sound output section outputting a sound; and changing vibration strength of a vibration section in accordance with the determined type of the sound output section.

A program according to the present technology includes causes a computer to execute steps of: determining a type of a sound output section outputting a sound; and changing vibration strength of a vibration section in accordance with the determined type of the sound output section.

Advantageous Effects of Invention

As described above, according to the present technology, it is possible to provide a technology that enhances the user experience by appropriately setting the vibration strength for each type of the sound output section.

MODE(S) FOR CARRYING OUT THE INVENTION

Hereinafter, embodiments of the present technology will be described with reference to the drawings.

First Embodiment

<Overall Configuration and Configuration of Each Component>

Figure 1:
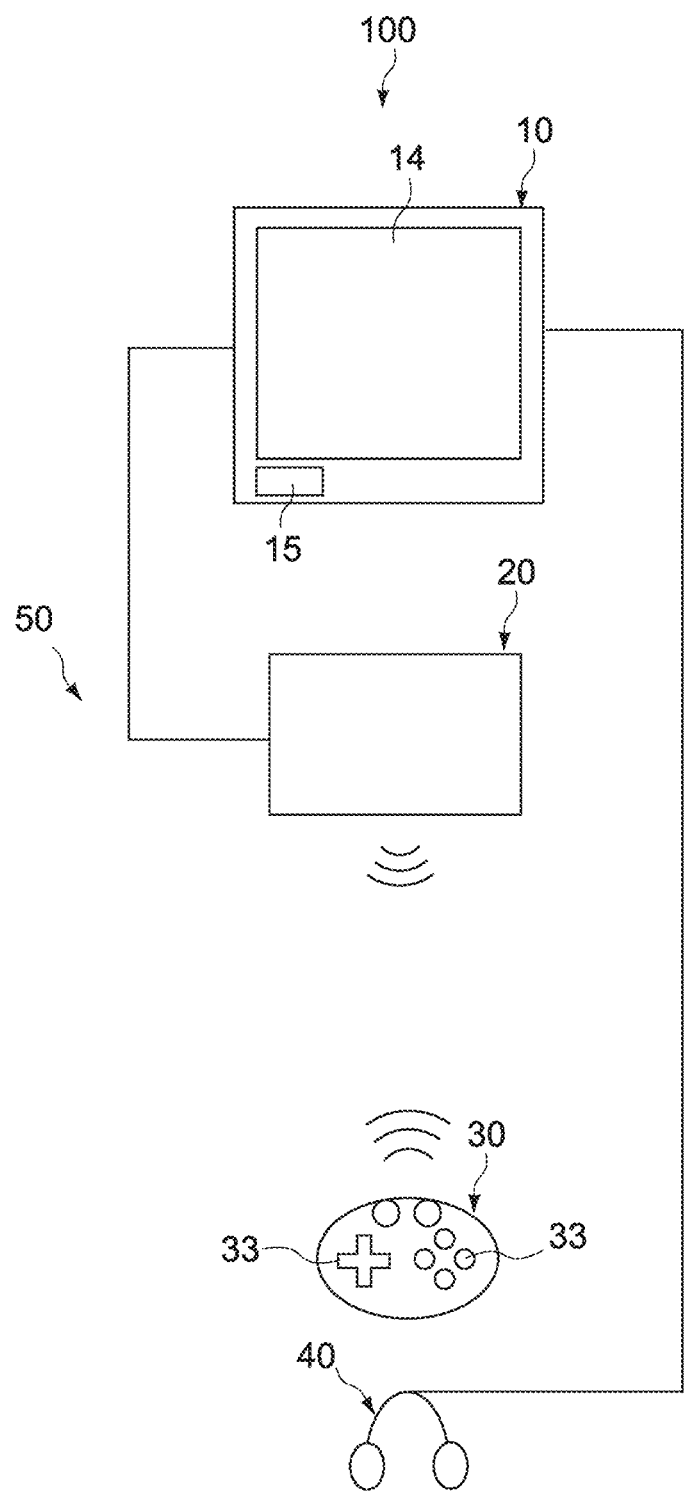
FIG. 1 A diagram showing a game system according to a first embodiment of the present technology.
Figure 2:
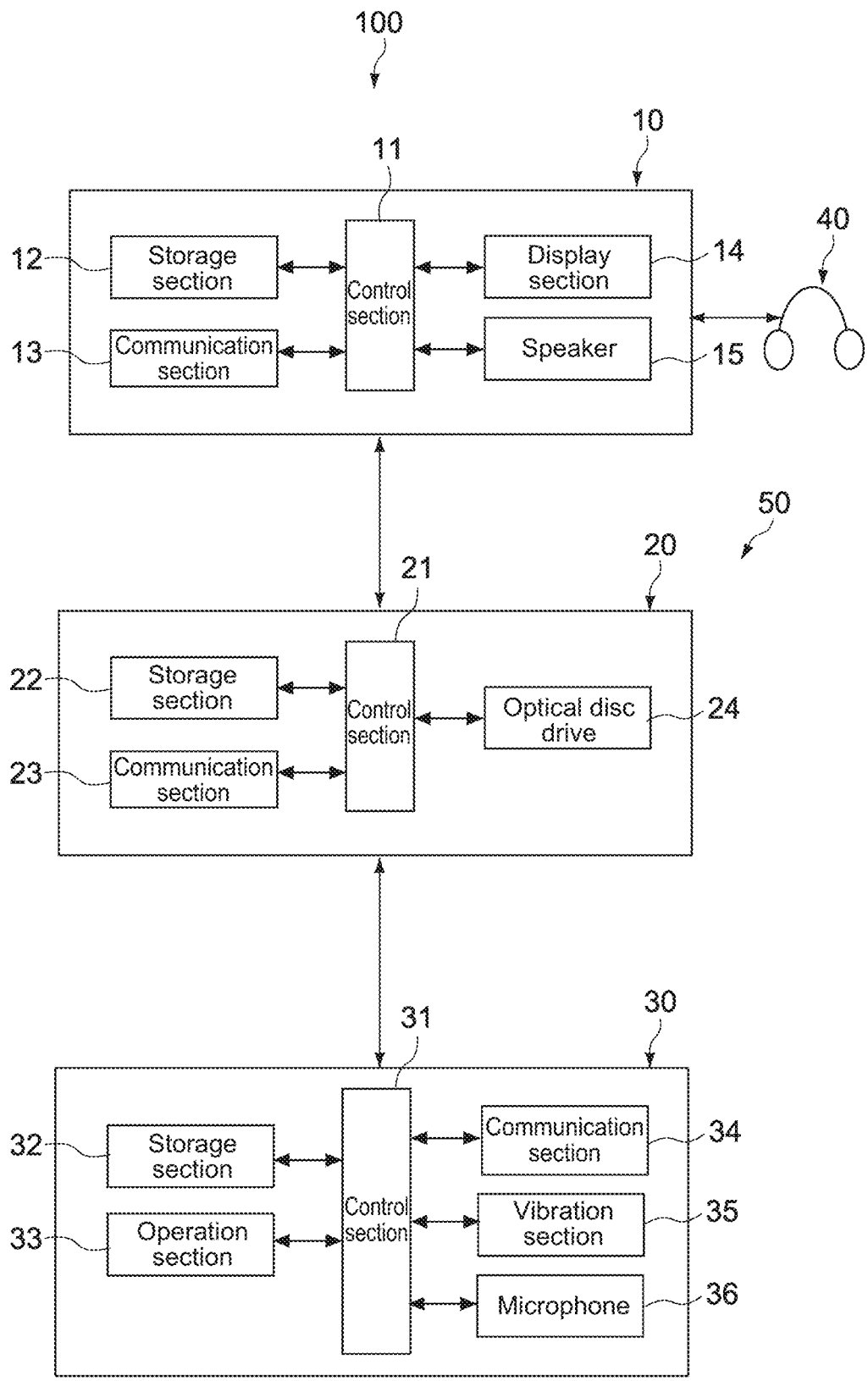
FIG. 2 A block diagram showing a configuration of the game system.

FIG. 1 is a diagram showing a game system 100 according to a first embodiment of the present technology. FIG. 2 is a block diagram showing a configuration of the game system 100.

As shown in FIGS. 1 and 2, the game system 100 includes an output apparatus 10 and a game apparatus 50 (information processing apparatus). The game apparatus 50 includes a game apparatus body 30 and a controller 40.

The output apparatus 10 is, for example, a television apparatus having a tuner function. Note that the output apparatus 10 may be a monitor having no tuner function. The game apparatus 50 may be a game-dedicated machine, a PC (Personal Computer), or the like.

The output apparatus 10 includes a control section 11, a storage section 12, a communication section 13, a display section 14, and a speaker 15 (sound output section).

The control section 11 of the output apparatus 10 includes a CPU (Central Processing Unit) or the like. The control section 11 of the output apparatus 10 executes a variety of calculations on the basis of a variety of programs stored in the storage section 12 and comprehensively controls each component of the output apparatus 10.

The storage section 12 of the output apparatus 10 includes a nonvolatile memory in which a variety of programs and a variety of data items needed for processing of the control section 11 of the output apparatus 10 are stored and a volatile memory used as a working area of the control section 11 of the output apparatus 10.

The display section 14 includes, for example, a liquid crystal display, an EL (Electro Luminescence) display, or the like. The display section 14 allows a video according to a video signal transmitted from a game apparatus body 20 to be displayed on a screen. The speaker 15 outputs a sound of the game according to a sound signal transmitted from the game apparatus body 20.

Though the example shown in FIG. 1 shows the case that display section 14 and the speaker 15 are integrated, the display section 14 and the speaker 15 may be separately included.

The communication section 13 of the output apparatus 10 is configured to be capable of performing wired or wirelessly communication with the game apparatus body 20. The communication section 13 of the output apparatus 10 receives the video signal and the sound signal transmitted from the game apparatus body 20.

In addition, the communication section 13 of the output apparatus 10 is configured to be capable of performing wired or wirelessly communication with a headphone 40 (sound output section: including earphone). The headphone 40 outputs a game sound according to the sound signal transmitted from the game apparatus body 20 in accordance with the control by the output apparatus 10.

The output apparatus 10 is configured such that when a sound is allowed to be output from the speaker 15, the sound is not allowed to be output from the headphone 40. To the contrary, the output apparatus 10 is configured such that when the sound is allowed to be output from the headphone 40, the sound is not allowed to be output from the speaker 15.

The game apparatus body 20 includes a control section 21, a storage section 22, a communication section 23, and an optical disc drive 24.

The optical disc drive 24 reads a game program from an optical disc (DVD (digital versatile Disc), blu-ray disc, etc.) in which the game program is recorded, and outputs the game program to the control section 21. The game apparatus body 20 has a loading/unloading mechanism (not shown) of the optical disc. The optical disc is loaded to the game apparatus body 20 and is unloaded from the game apparatus body 20 by the loading/unloading mechanism. Note that the game program may be downloaded from a server apparatus on a network.

The control section 21 of the game apparatus body 20 includes the CPU (Central Processing Unit) and the like. The control section 21 of the game apparatus body 20 executes a variety of calculations on the basis of a variety of programs stored in the storage section 22 and comprehensively controls each component of the game apparatus body 20.

The storage section 22 of the game apparatus body 20 includes a nonvolatile memory in which a variety of programs and a variety of data items needed for processing of the control section 21 of the game apparatus body 20 are stored, and a volatile memory used as a working area of the control section 21 of the game apparatus body 20.

The communication section 23 of the game apparatus body 20 is configured to be capable of performing wired or wirelessly communication with the controller 30 and the output apparatus 10. Incidentally, the communication section 23 of the game apparatus body 20 may be configured to be capable of communicating with the server apparatus (not shown) on the network.

The communication section 23 of the game apparatus body 20 transmits the video signal and the sound signal of the game to the output apparatus 10 on the basis of the control by a control section 31 of the game apparatus body 20.

In addition, the communication section 23 of the game apparatus body 20 receives an operation signal transmitted from the controller 30 and outputs the operation signal to the control section 21 of the game apparatus body 20. The control section 21 of the game apparatus body 20 causes operation contents to be reflected in response to the operation signal.

The controller 30 includes the control section 31, a storage section 32, an operation section 33, a communication section 34, a vibration section 35, and a microphone 36.

The control section 31 of the controller 30 includes the CPU (Central Processing Unit) and the like. The control section 31 of the controller 30 executes a variety of calculations on the basis of a variety of programs stored in the storage section 32 and comprehensively controls each component of the controller 30.

The storage section 32 of the controller 30 includes a nonvolatile memory in which a variety of programs and a variety of data items needed for processing of the control section 31 of the controller 30 are stored, and a volatile memory used as a working area of the control section 31 of the controller 30.

The operation section 33 includes a cursor key such as a cross key and a joy stick, a press button, and the like. The operation section 33 generates the operation signal in accordance with an operation by a user and outputs the operation signal to the control section 31 of the controller 30.

The communication section 34 of the controller 30 is configured to be capable of performing wired or wirelessly communication with the game apparatus body 20. The communication section 34 of the controller 30 transmits the operation signal generated by the operation section 33 to the game apparatus body 20 on the basis of the control by the control section 31 of the controller 30.

The vibration section 35 includes an eccentric motor, a voice coil motor (VCM), and the like. The vibration section 35 is configured to be capable of changing vibration strength (including vibration magnitude and vibration frequency) on the basis of an input voltage.

The microphone 36 is arranged for collecting an environmental sound surrounding the user, converts the environmental sound into an electrical signal, and outputs the electrical signal to the control section 31. Here, the environmental sound is a sound output from the speaker 15 or the headphone 40 other than the game sound with respect to a video of the game.

The environmental sound includes a sound output from a variety of electronic apparatuses such as an air conditioner, a fan, a washing machine, a cleaner, an electric heater, a television apparatus (other television apparatus in a case where the output apparatus 10 is a television apparatus), an audio apparatus, and the like. In addition, the environmental sound includes a water sound flowing from a water tap, a sound generated upon use of gas, a sound with respect to an infrastructure installation such as a sound of a driving vehicle on a road, a human speaking voice, and a sound with respect to a creature such as a call of animal. Furthermore, the environmental sound includes a siren sound of an ambulance, a fire truck, or a police car, a sound of baby crying, a sudden sound such as a sound of dog barking, and the like.

<Description About Action>

Figure 3:
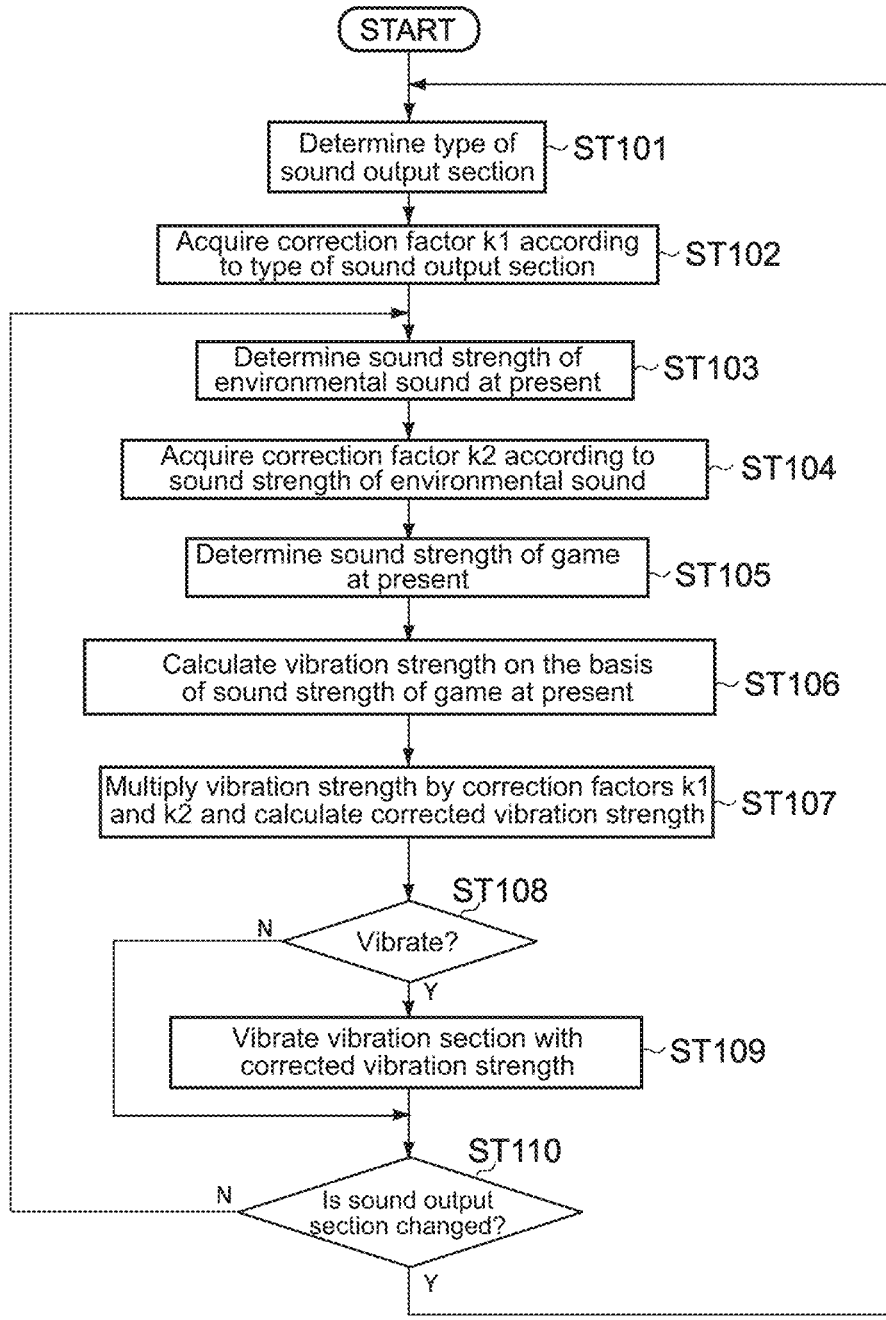
FIG. 3 A flowchart showing processing of a control section of a controller.

Next, processing of the game system 100 will be described. In the description about the processing, in particular, processing of the control section 31 of the controller 30 will be mainly described. FIG. 3 is a flowchart showing the processing of the control section 31 of the controller 30.

First, the control section 31 of the controller 30 determines a type of the sound output section (Step 101). Specifically, the control section 31 of the controller 30 determines that the sound output section outputting the game sound at present is the speaker 15 or the headphone 40.

Note that when the type of the sound output section is determined, the control section 31 of the controller 30 transmits an acquisition request for identification information showing the type of the sound output section to the output apparatus 10 via the game apparatus body 20. Then, the control section 31 of the controller 30 determines the type of the sound output section on the basis of the identification information transmitted from the output apparatus 10.

Next, the control section 31 of the controller 30 acquires a correction factor k1 according to the type of the sound output section from the storage section 32 of the controller 30 (Step 102). Here, the correction factor k1 is a value used for correcting (changing) the vibration strength of the vibration section 35 (value used for multiplication) in accordance with the type of the sound output section. The correction factor k1 is determined in advance in accordance with the type of the sound output section. The correction factor k1 is stored in advance in the storage section 32 of the controller 30 in association with the type of the sound output section. Note that the correction factor k1 in this embodiment is a positive number.

Here, strength of a sound (including sound pressure and sound frequency) felt by the user is different in a case where the present sound output section is the speaker 15 and the game sound is output from the speaker 15 and in a case where the present sound output section is the headphone 40 and the game sound is output from the headphone 40. Note that it is supposed that a magnitude of the sound volume (volume value, for example, of a scale of 100) set on the output apparatus 10 is the same. In this case, the user often and generally feels that the sound strength of the game output from the speaker 15 is stronger than the sound strength of the game output from the headphone 40.

The value of the correction factor k1 has a relationship with the sound strength of the game felt by the user for each type of the sound output section. According to this embodiment, in a case where the sound volume is the same, the larger correction factor k1 is set on the sound output section in which the user feels that the sound strength of the game is strong.

According to this embodiment, in a case where the sound volume is the same, the user feels that the sound strength of the game output from the headphone 40 is stronger than that of the game output from the speaker 15. Thus, the correction factor k1 for the headphone 40 is set greater than the correction factor k1 for the speaker 15. For example, the correction factor k1 for the speaker 15 is 1 and the correction factor k1 for the headphone 40 is 1.2.

Here, according to this embodiment, it is simply determined that the sound output section is the speaker 15 or the headphone 40. In other words, it is a simple choice between the two. On the other hand, there are a variety of types of the speaker 15 and a variety of types of the headphone 40. Accordingly, how great the sound strength felt by the user may be considered for each type of the speaker 15 and the headphone 40 and the correction factor k1 may be prepared for each type of the speaker 15 and the headphone 40.

In order to determine how great the sound strength of the game felt by the user for each type of the speaker 15 and the headphone 40, the control section 31 of the controller 30 may acquire information about a resistance value of the speaker 15 or the headphone 40.

Alternatively, in the game system 100, processing of selecting each type and each shape of the speaker 15 and the headphone 40 by the user may be executed. In this case, for example, an image for selecting each type and each shape of the speaker 15 and the headphone 40 is displayed on the display section 14 of the output apparatus 10. By operating the operation section 33 of the controller 30, the user can select each type and each shape of the speaker 15 and the headphone 40.

Ater the correction factor k1 is acquired, the control section 31 of the controller 30 determines the sound strength (including sound pressure and sound frequency) of the environmental sound on the basis of sound information acquired from the microphone 36 (Step 103). The sound strength of the environmental sound may be an average value of the sound strength from a predetermined time before a current time (for example, about several seconds) to the current time or may be the sound strength at that moment of the current time.

Here, in a case where the game sound is output from the speaker 15, the sound acquired from the microphone 36 includes the game sound output from the speaker 15 in addition to the environmental sound. Accordingly, the control section 31 of the controller 30 typically takes out the environmental sound (for example, takes out environmental sound by filtering) and determines the sound strength of the environmental sound from a mixture sound acquired from the game sound and the environmental sound.

After the sound strength of the environmental sound is determined, next, the control section 31 of the controller 30 acquires a correction factor k2 according to the sound strength of the environmental sound from the storage section 32 of the controller 30 (Step 104).

Here, the correction factor k2 is a value used for correcting (changing) the vibration strength of the vibration section 35 (value used for multiplication) in accordance with the sound strength of the environmental sound. The correction factor k2 is determined in advance in accordance with the sound strength of the environmental sound. The correction factor k2 is stored in advance in the storage section 32 of the controller 30 in association with the sound strength of the environmental sound. Note that the correction factor k2 in this embodiment is a positive number.

Here, the sound strength felt by the user is different in a case where the sound strength of the environmental sound is strong and in a case where the sound strength of the environmental sound is weak. In this case, the user feels that the sound strength of the game is stronger when the sound strength of the environmental sound is weak (quiet) as compared with when the sound strength of the environmental sound is strong (loud).

The value of the correction factor k2 has a relationship with the sound strength of the game felt by the user in accordance with the sound strength of the environmental sound. Specifically, the weaker (quieter) the sound strength of the environmental sound is, i.e., the stronger the user feels the game sound, the greater the value of the correction factor k2 set is. For example, in a case where the environmental sound is 0 (or almost 0), the correction factor k2 is 1. As the environmental sound becomes strong, the value of the correction factor k2 is set to 0.9, 0.8 . . . (note that the correction factor k2 has a lower limit value and does not become 0).

In addition, even if the sound strength of the environmental sound is the same, the strength of environmental sound felt by the user is different in a case where the game sound is output from the speaker 15 and in a case where the game sound is output from the headphone 40. Specifically, if the sound strength of the environmental sound is the same, the user feels that the sound strength of the environmental sound is weak when the user wears the headphone 40 and hears the game sound from the headphone 40 as compared with when the user hers the game sound output from the speaker 15.

Accordingly, the value of the correction factor k2 for the game sound output from the speaker 15 may be different from the value of the correction factor k2 for the game sound output from the headphone 40. In this case, in a case where the sound strength of the environmental sound is the same, the larger value is set on the correction factor k2 at the sound output section in which the user feels that the sound strength of the environmental sound is weak, i.e., at the sound output section in which the user feels that the game sound is strong. In this case, for example, the correction factor k2 for the sound output from the headphone 40 is set greater than the correction factor k2 for the sound output from the speaker 15.

After the correction factor k2 is acquired, next, the control section 31 of the controller 30 determines the sound strength of the game at present (Step 105).

In this case, typically, the control section 31 of the controller 30 transmits an acquisition request for information about how much strength of the game sound is output from the sound output section at present to the output apparatus 10 via the game apparatus body 20. The control section 31 of the controller 30 determines the sound strength of the game on the basis of the information received from the output apparatus 10.

Note that the game sound is output from the speaker 15, the sound strength of the game at present may be determined on the basis of the information about the game sound acquired by the microphone 36. In addition, the sound strength of the game at present may be determined by using both of the information acquired from the output apparatus 10 and the information acquired from microphone 36.

After the sound strength of the game at present is determined, the control section 31 calculates the vibration strength of the vibration section 35 on the basis of the sound strength of the game at present (Step 106). According to this embodiment, the value of the vibration strength of the vibration section 35 is set such that the stronger the sound strength of the game at present is, the stronger the vibration strength is. For example, a ratio of the sound strength of the game at present to the vibration strength to be determined is set to be always constant. The ratio r may be set, for example, by a designer of the game for each game or for each platform, or may be set by the user.

After the vibration strength is calculated, the control section 31 of the controller 30 multiplies the vibration strength by the correction factor k1 and the correction factor k2 and calculates the corrected vibration strength (Step 107).

Here, as described above, the higher value of the correction factor k1 is set on the sound output section in which the user feels that the sound strength of the game is strong. Accordingly, according to this embodiment, by multiplying the value of the vibration strength by the correction factor k1, the vibration strength is corrected (changed) such that the vibration strength is stronger at the sound output section in which the user feels that the game sound is strong.

In addition, as described above, the higher value of the correction factor k2 is set such that the weaker the sound strength of the environmental sound is, i.e., the stronger the user feels the game sound. Accordingly, by multiplying the value of the vibration strength by the correction factor k2, the vibration strength is corrected (changed) such that the weaker the sound strength of the environmental sound is, i.e., the stronger the game sound that the user feels is, the stronger the vibration strength is.

Note that as understood from the description, the correction factor k1 and the correction factor k2 are in common in that the vibration strength is corrected such that the stronger the sound strength of the game felt by the user is, the stronger the vibration of the vibration section 35 is.

After the control section 31 of the controller 30 calculates the corrected vibration strength, the control section 31 of the controller 30 determines whether or not it is a timing to vibrate the vibration section 35 at present (Step 108). An instruction whether or not the vibration section 35 is vibrated is transmitted from the game apparatus body 20. The control section 31 of the controller 30 determines whether or not it is the timing to vibrate the vibration section 35 at the present in accordance with the instruction.

In a case where it is the timing to vibrate vibration section 35 at present (YES in Step 108), the control section 31 of the controller 30 vibrates the vibration section 35 with the corrected vibration strength (Step 109) and proceeds to next Step 110. When the vibration section 35 is vibrated, the whole controller 30 is vibrated at the strength according to the vibration of the vibration section 35 and the vibration is transmitted to user's hands. Note that, in this example, the vibration strength is changed at all timings to vibrate the vibration section 35. However, the vibration strength may be changed at one of the timings.

In a case where it is not the timing to vibrate vibration section 35 at present (No in Step 108), the control section 31 of the controller 30 does not vibrate the vibration section 35 and proceeds to next Step 110.

In Step 110, the control section 31 of the controller 30 determines whether or not the type of the sound output section that outputs the game sound is changed. Note that in a case where the type of the sound output section is changed, a signal showing that the type of the sound output section is changed is transmitted from the output apparatus 10 to the controller 30 via the game apparatus body 20.

In a case where the type of the sound output section is changed (YES in Step 110), the control section 31 returns to Step 101 to determine the type of the sound output section. On the other hand, the type of the sound output section is not changed (NO in Step 110), the control section 31 returns to Step 103 to determine the sound strength of the environmental sound.

<Actions, etc.>

Here, if the vibration strength of the controller 30 is weak with respect to the sound strength of the game, the vibration of the controller 30 is interrupted by the game sound and the user may feel the vibration weaker than the actual vibration. In addition, if the vibration strength of the controller 30 is weak with respect to the sound strength of the game, the user may feel that the game sound and the vibration of the controller 30 are separated.

On the other hand, according to this embodiment, the vibration strength of the vibration section 35 (vibration strength of controller 30) is appropriately set in relation to the sound strength of the game. Specifically, the vibration strength of the vibration section 35 is changed such that the higher the sound strength of the game is, the higher the vibration strength of the vibration section 35 is.

With this, it is possible to prevent the user from feeling that the vibration strength of the controller 30 is weak with respect to the sound strength of the game. Accordingly, it is possible to prevent the user from feeling that the vibration of the controller 30 is interrupted by the game sound such that the vibration is difficult to be felt and to prevent the user from feeling that the game sound and the vibration of the controller 30 are separated. Furthermore, by making the vibration strength of the vibration section 35 stronger as the sound strength of the game stronger, it is possible to feel the user that the game sound and the vibration of the controller 30 are cooperated. Thus, according to this embodiment, a user experience can be enhanced.

In addition, according to this embodiment, the type of the sound output section is determined and the vibration strength of the vibration section 35 is corrected (changed) in accordance with the determined type of the sound output section. With this, it is possible to appropriately set the vibration strength for each type of the sound output section. As a result, the user experience can be enhanced.

In particular, according to this embodiment, the vibration strength of the vibration section 35 is corrected (changed) such that the vibration of the vibration section 35 becomes strong at the sound output section in which the user feels that the sound strength of the game is strong. With this, it is possible to appropriately change the vibration strength of the vibration section 35 along with the sound strength of the game actually felt by the user. Furthermore, the user experience can be enhanced.

In addition, according to this embodiment, the sound strength of the environmental sound is determined and the vibration strength of the vibration section 35 is corrected (changed) in accordance with the sound strength of the determined environmental sound. With this, it is possible to appropriately set the vibration strength in accordance with the sound strength of the environmental sound. As a result, the user experience can be enhanced.

In particular, according to this embodiment, the vibration strength is corrected (changed) such that the weaker the sound strength of the environmental sound is, i.e., the stronger the user feels the game sound, the stronger the vibration strength is. With this, it is possible to appropriately change the vibration strength of the vibration section 35 along with the sound strength of the game actually felt by the user. Furthermore, the user experience can be enhanced.

Modification of First Embodiment

The above describes that the stronger the sound strength of the game is, the stronger the vibration of the vibration section 35 is (in other words, the weaker the sound strength of the game is, the weaker the vibration strength of the vibration section 35 is). On the other hand, the vibration strength may be changed such that the stronger the sound strength of the game is, the weaker the vibration strength of the vibration section 35 is (in other words, the weaker the sound strength of the game is, the stronger the vibration strength of the vibration section 35 is).

Here, in a case where the timing at which the game sound is output is matched with the timing at which the vibration section 35 vibrates, for example, in a case where the vibration section 35 vibrates along with footsteps, the vibration may be felt stronger than the actual vibration strength. For example, in this case, the vibration strength may be changed such that the stronger the sound strength of the game is, the weaker the vibration of the vibration section 35 is.

By taking an example that the vibration section vibrates along with the footsteps, the vibration strength of the vibration section 35 is made weak not in a case where the sound strength of the footsteps is weak but in a case where the sound strength of the footsteps is strong. In this case, it can prevent that the user feels discomfort because the vibration strength felt by the user is different in a case where the timings of the sound and the vibration are matched and in a case where the timings of the sound and the vibration are not matched.

Note that the similar is true for the case that the vibration strength of the vibration section 35 is corrected (changed) in accordance with the type of the sound output section or the case that the vibration strength of the vibration section 35 is corrected (changed) in accordance with the sound strength of the environmental sound.

In other words, in a case where the timing at which the game sound is output is matched with the timing at which the vibration section 35 vibrates, the vibration strength may be corrected (changed) such that the vibration strength is weaker at the sound output section in which the user feels that the game sound is strong.

In addition, in a case where the timing at which the game sound is output is matched with the timing at which the vibration section 35 vibrates, the vibration strength may be corrected (changed) such that the stronger the sound strength of the environmental sound is, i.e., the weaker the vibration strength is, the weaker the vibration strength is.

Here, a method of changing the vibration strength of the vibration section on the basis of the sound strength of the game will be specifically described. Note that, in the present specification, the "sound strength" includes both of the sound strength output from the sound output section and the sound strength felt by the user. In addition, the "vibration strength" includes both of the vibration strength of the vibration section and the vibration strength felt by the user.

The sound strength actually felt by the user has a relationship with the sound pressure and the sound frequency. In addition, the vibration strength actually felt by the user's hands has a relationship with the vibration magnitude and the vibration frequency.

Accordingly, there are roughly divided into four methods of changing the vibration strength of the vibration section in accordance with the sound strength of the game. Note that two or more methods of the four methods (1) to (4) may be combined.

(1) The vibration magnitude of the vibration section 35 is changed in accordance with the sound pressure of the game sound, (2) a vibration frequency of the vibration section 35 is changed in accordance with the sound pressure of the game sound, (3) the vibration magnitude of the vibration section 35 is changed in accordance with the frequency of the game sound, and (4) the vibration frequency of the vibration section 35 is changed in accordance with the frequency of the game sound.

Here, with respect to the sound frequency, it is known that a human audible range is about 20 Hz to 20 kHz and a sound maximum sensitivity point is around 3 kHz. In other words, if the sound pressure is the same, as the sound frequency is close to the sound maximum sensitivity point of 3 kHz, the user feels that the sound strength is strong. Accordingly, in a case where the frequency of the game sound is taken into consideration in the (3) and (4), this relationship is used.

In addition, with respect to the vibration frequency, it is known that a human hand has a vibration maximum sensitivity point around 200 Hz. In other words, if the vibration magnitude is the same, as it is close to the vibration maximum sensitivity point of 200 Hz, the user feels that the vibration strength is strong. Accordingly, in a case where the vibration frequency is taken into consideration in the (2) and (4), this relationship is used. Note that with respect to parts other than the hands, the vibration maximum sensitivity point may be different from 200 Hz.

Incidentally, in the cases of the (2) and (4), a voice coil motor is typically used as the vibration section 35 (because vibration frequency is easily controlled). On the other hand, in the cases of the (1) and (3), as the vibration section 35, the voice coil motor may be used or the eccentric motor may be used.

In addition, in the case of the (2) and (4), the vibration section 35 may be vibrated by using a frequency band around a resonance point on which the vibration becomes maximum by taking characteristics of the vibration section 35 into consideration.

Here, depending on a state that the controller 30 (example of vibrator) is held by the user (posture of controller 30, force of gripping controller 30 by user), a way to vibrate the controller 30 is changed and the vibration strength felt by the user may be different.

In this case, the information about the state that the controller 30 is held by the user may be detected by using a variety of sensors such as an acceleration sensor, an angular velocity sensor, and a pressure sensor. In this case, the control section of the controller 30 may acquire the information from the variety of sensors and may change the vibration strength of the vibration section 35 in accordance with the information.

In addition, the sound strength and the vibration strength felt by the user are different depending on an age and an individual (for example, mosquito sound is easy to hear for younger people). Accordingly, the control section 31 of the controller 30 may acquire sensitivity of the sound strength output from the sound output section or sensitivity information relating to sensitivity of the vibration strength of the vibration section 35 and may change the vibration strength of the vibration section 35 on the basis of the sensitivity information.

Examples of the sensitivity information include information about a user's age, sound sensitivity for each user, information about vibration sensitivity, and the like. The information about the user's age can be acquired from user information, for example. In addition, the sound sensitivity for each user and the information about the vibration sensitivity can be acquired by determining how much sensitivity the user has with respect to the sound and the vibration by generating the sound and the vibration for each game, for example.

(Environmental Sound)

The above describes that the microphone 36 that collects the environmental sound is arranged at the game controller 30. Alternatively, the microphone 36 may be arranged at the game apparatus body 20, the output apparatus 10, or the like.

Here, the sound strength of the environmental sound acquired by the microphone 36 may be different from the sound strength of the environmental sound at a position of the user (in particular, ear position). This is because there is a distance between a position of the microphone 36 and the position of the user. In particular, if the microphone 36 is arranged at the game apparatus body 20 or the output apparatus 10, the distance between the position of the user and the microphone 36 becomes far. Thus, the sound strength of the environmental sound acquired by the microphone 36 may be greatly different from the sound strength of the environmental sound at the position of the user.

Accordingly, the difference between the sound strength of the environmental sound acquired by the microphone 36 and the sound strength of the environmental sound at the position of the user may be taken into consideration and the sound strength of the environmental sound at the position of the user may be determined.

Figure 4:
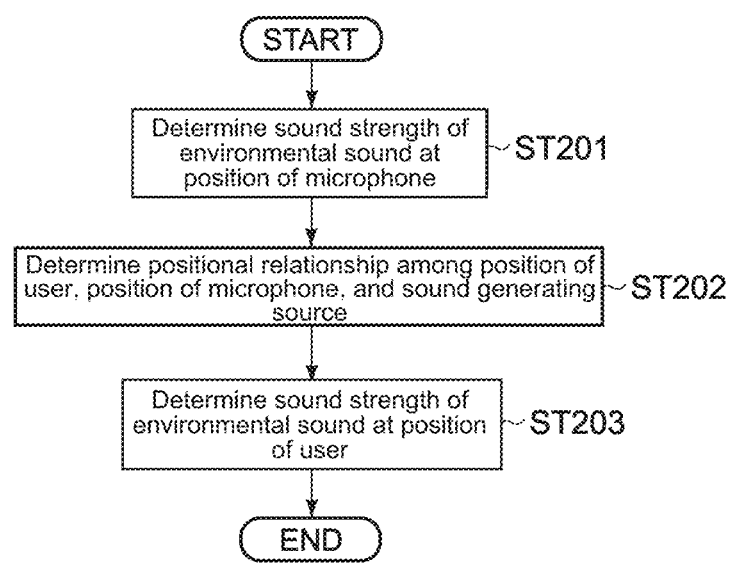
FIG. 4 A flowchart showing processing of determining sound strength of an environmental sound at a position of a user.

FIG. 4 is a flowchart showing processing of determining the sound strength of the environmental sound at the position of the user.

The control section 31 of the controller 30 first determines the sound strength of the environmental sound at the position of the microphone 36 on the basis of the information about the sound strength of the environmental sound acquired by the microphone 36 (Step 201). Note that if the microphone is arranged at the game apparatus body 20, the output apparatus 10, or the like, the controller 30 receives the information about the sound acquired by the microphone 36 every predetermined time, for example, from the game apparatus body 20, the output apparatus 10, or the like. Note that the processing in Step 201 is basically the same as that in Step 103 as described above.

Next, the control section 31 of the controller 30 determines a spatial positional relationship among the position of the user, the position of the microphone, and a position of a sound generating source of the environmental sound (air conditioner, washing machine, or the like) (Step 202).

The position of the user is determined on the basis of an image acquired by a camera (not shown, typically two or more arranged), for example, arranged at the game apparatus body 20, the output apparatus 10, or the like. At this time, the ear position of the user may be determined on the basis of a face detection.

The position of the microphone 36 is also determined on the basis of the image acquired by the camera, for example, arranged at the game apparatus body 20, the output apparatus 10, or the like. For example, in a case where the microphone 36 is arranged at the game apparatus body 20 and the camera is arranged at the output apparatus 10, the game apparatus body 20 appears on the image acquired by the camera. Thus, the position of the game apparatus body 20 is determined as the position of the microphone 36.

The position of the sound generating source is also determined on the basis of the image acquired by the camera, for example, arranged at the game apparatus body 20, the output apparatus 10, or the like. In this case, as long as the sound generating source appears on the image, it is possible to determine the position of the sound generating source. Note that it is assumed that the sound generating source is positioned dislocated from an angle of view of the camera. In such a case, a sound directivity and the sound strength may be determined from the sound information acquired by the microphone 36 and the positional relationship of the sound generating source with respect to the positon of the microphone may be determined. Alternatively, it is also possible to measure the distance from an optical sensor or the like.

In addition, it is also assumed that the game apparatus body 20 and the output apparatus 10 are linked with other electronic apparatuses such as the air conditioner and the washing machine as a system. Accordingly, in such a case, information showing that other electronic apparatuses linked as a system is in operation may be secondarily used as information for determining the positon of the sound generating source.

After the control section 31 of the controller 30 determines the spatial positional relationship among the three, the control section 31 of the controller 30 determines the sound strength of the environmental sound at the position of the user on the basis of the sound strength of the environmental sound at the positon of the microphone 36 and the spatial positional relationship among the three (Step 203).

For example, in a case where a distance between the position of the microphone 36 and the sound generating source is shorter than a distance between the position of the user and the sound generating source, the sound strength of the environmental sound at the position of the user is weaker than the environmental sound at the position of the microphone 36. To the contrary, in a case where the distance between the position of the microphone 36 and the sound generating source is longer than the distance between the position of the user and the sound generating source, the sound strength of the environmental sound at the position of the user is stronger than the environmental sound at the position of the microphone 36. By using this relationship, the control section 31 of the controller 30 determines the sound strength of the environmental sound at the position of the user in accordance with the sound strength of the environmental sound acquired by the microphone 36.

Note that in a case where the sound strength of the environmental sound is determined at the position of the user, the correction factor k2 according to the sound strength of the environmental sound is acquired. By the correction factor k2, the vibration strength of the vibration section 35 may be corrected.

Here, the sound strength of the game output from the sound output section may be changed in accordance with the sound strength of the environmental sound. In this case, the sound strength of the game is typically changed such that the stronger the sound strength of the environmental sound is, the stronger the game sound is.

In this case, the control section 31 of the controller 30 issues an instruction on the game apparatus body 20 and the output apparatus 10 such that the game sound becomes strong in accordance with the sound strength of the environmental sound in a case where the sound strength of the environmental sound exceeds a predetermined threshold, for example. With this, in a case where the sound strength of the environmental sound is strong (laud), the sound strength of the game will be automatically strong. In addition, since the sound strength of the game becomes strong, the vibration strength of the vibration section 35 will be strong in accordance therewith.

Furthermore, after the type of the environmental sound is determined, processing to be executed may be determined in accordance with the type of the environmental sound. In this case, for example, if the environmental sound is a sound always generated such as a sound of the air conditioner, the sound strength of the game is changed such that the game sound becomes strong. On the other hand, if the environmental sound is a sudden sound (such as sound of ambulance), it does not move to a game scene in which vibration is important (in relation to scene, see fourth embodiment described later) and it switches a scene in which the vibration is not important. When the sudden environmental sound is ended, processing such as moving to an original scene in which the vibration is important may be executed.

Second Embodiment

Next, a second embodiment of the present technology will be described. Mainly, points different from the first embodiment will be described in the second embodiment.

Here, as described above, according to the first embodiment, the vibration strength is changed such that the stronger the sound strength of the game is, the stronger the vibration strength is. In this case, if the sound strength of the game becomes strong, the vibration strength reaches a maximum value. It is assumed that the vibration strength cannot be stronger than that.

According to the second embodiment, when the (changed) vibration strength thus reaches the maximum value, processing of changing the sound strength of the game is executed (i.e., in accordance with the vibration strength, the sound strength is changed).

Figure 5:
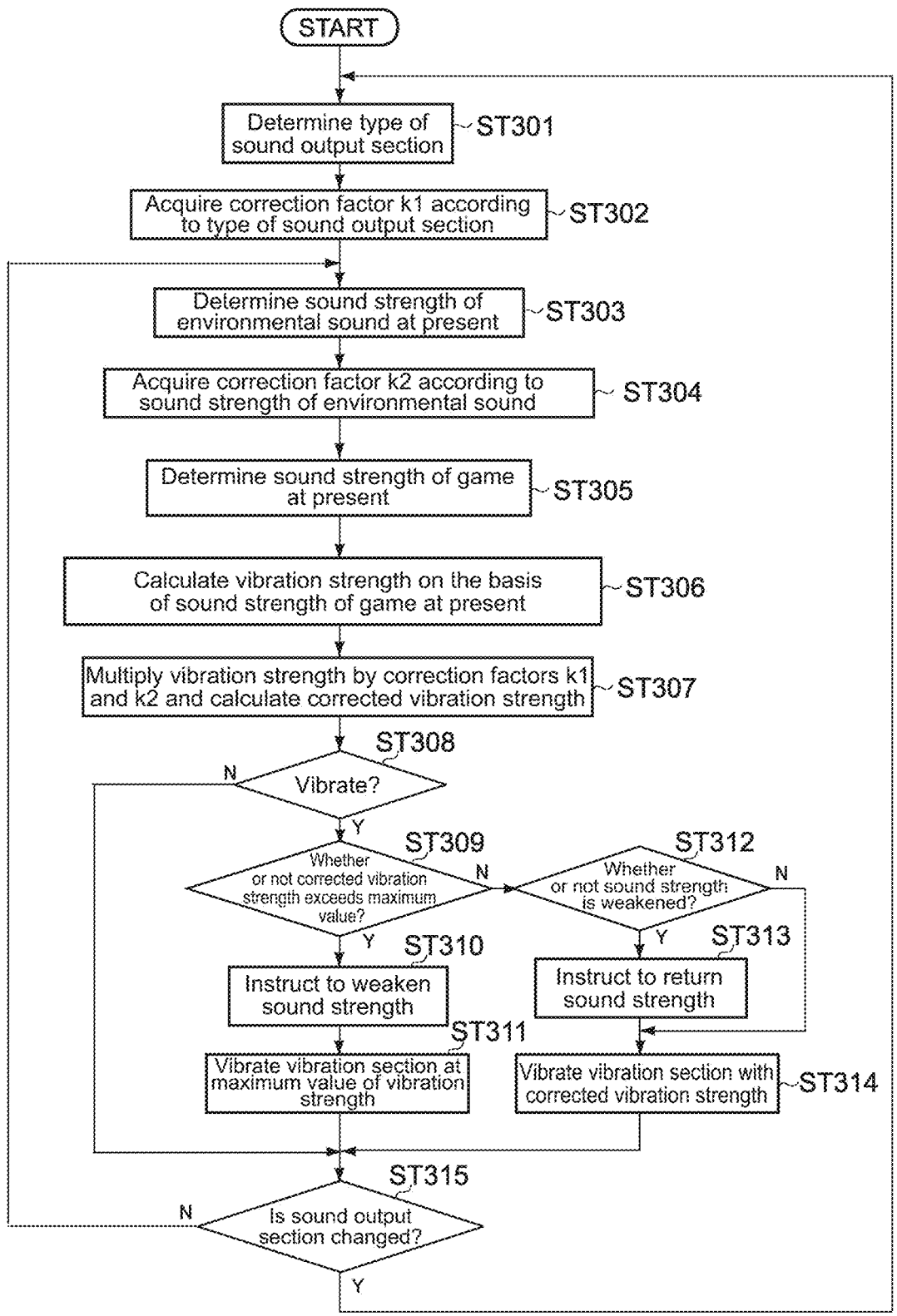
FIG. 5 A flowchart showing processing according to a second embodiment.

FIG. 5 is a flowchart showing the processing according to the second embodiment. Steps 301 to 308, and 315 of FIG. 5 are the same as Steps 101 to 108, and 110 of FIG. 3.

After the control section 31 of the controller 30 calculates the vibration strength corrected by multiplying the vibration strength calculated on the basis of the sound strength of the game at present by the correction factors k1 and k2, the control section 31 of the controller 30 determines whether or not it is the timing to vibrate the vibration section 35 at present (Step 308).

In a case where it is the timing to vibrate the vibration section 35 at present (YES in Step 308), the control section 31 of the controller 30 determines whether or not the corrected vibration strength exceeds the maximum value of the vibration strength of the vibration section 35 (Step 309).

In a case where the corrected vibration strength exceeds the maximum value of the vibration strength of the vibration section 35 (YES in Step 309), the control section 31 of the controller 30 instructs the game apparatus body 20 and the output apparatus 10 to temporarily weaken the sound strength of the game (Step 310). Incidentally, the game sound to be weaken may be the whole game sound or a part of the whole game sound, e.g., a background music. Incidentally, if a part of the sound such as the background music is weaken, the sound strength may be made to be 0.

After the instruction to weaken the sound strength is issued, next, the control section 31 of the controller 30 vibrates the vibration section 35 at the maximum value of the vibration strength (Step 311).

In Step 309, in a case where the corrected vibration strength is lower than the maximum value of the vibration strength of the vibration section 35 (NO in Step 309), the control section 31 of the controller 30 determines whether or not the sound strength of the game is weakened in the game apparatus body 20 at present (Step 312).

In a case where the sound strength of the game is weakened (YES in Step 312), the control section 31 of the controller 30 instructs the game apparatus body 20 and the output apparatus 10 to return the sound strength of the game to original strength (Step 313) and proceeds to next Step 314.

In Step 312, in a case where the sound strength of the game is not weakened (NO in Step 312), i.e., the sound strength of the game is the original strength, the control section 31 of the controller 30 skips Step 313 and proceeds to Step 314.

In Step 314, the control section 31 of the controller 30 vibrates the vibration section 35 with the corrected vibration strength.

According to the second embodiment, in a case where the vibration strength of the vibration section 35 reaches the maximum value and cannot be stronger than that, the sound strength of the game is weakened. With this, the vibration strength of the vibration section 35 felt by the user can be pseudo-strong.

The above describes that the sound strength of the game output from the sound output section is changed when the vibration strength of the vibration section 35 reaches the maximum value. On the other hand, when the vibration strength of the vibration section 35 is changed by the user, the sound strength of the game output from the sound output section may be changed in accordance with the vibration strength.

In this case, a menu screen on which the user arbitrarily set, for example, the vibration strength of the vibration section 35 (for example, a scale of three) is displayed on the display section 14 of the output apparatus 10. The control section 31 of the controller 30 changes the sound strength of the game output from the sound output section in accordance with the vibration strength of the vibration section 30 arbitrarily set on the menu screen. In this case, the control section 31 may change the sound strength such that the stronger the vibration strength is, the stronger the sound strength of the game is, or may change the sound strength such that the stronger the vibration strength is, the weaker the sound strength of the game is.

There are roughly divided into four methods of changing the sound strength of the game in accordance with the vibration strength of the vibration section 35. Note that two or more methods of the four methods (1) to (4) may be combined.

(1) The sound pressure of the game sound is changed in accordance with the vibration magnitude of the vibration section 35, (2) the sound pressure of the game sound is changed in accordance with the vibration frequency of the vibration section 35, (3) the frequency of the game sound is changed in accordance with the vibration magnitude of the vibration section 35, and (4) the frequency of the game sound is changed in accordance with the vibration frequency of the vibration section 35.

Third Embodiment

Next, a third embodiment of the present technology will be described. Here, in a case where the controller 30 is often vibrated and the vibration is strong, the user gets used to the strong vibration and becomes insensitive. The user may feel the vibration weaker than the actual vibration strength.

In a case where the user gets used to the vibration and feels the vibration weaker than the actual vibration strength, it is assumed that a big action is shown in the video of the game, for example, at the same time, the controller 30 is vibrated. In this case, the user may feel that the vibration strength actually felt by the user does not match with the big action in the video and the user may feel strange.

According to the third embodiment, in such a case, processing of changing the video in accordance with the vibration frequency and the vibration strength (i.e., in accordance with the vibration) is executed in order to prevent the user from feeing strange.

Figure 6:
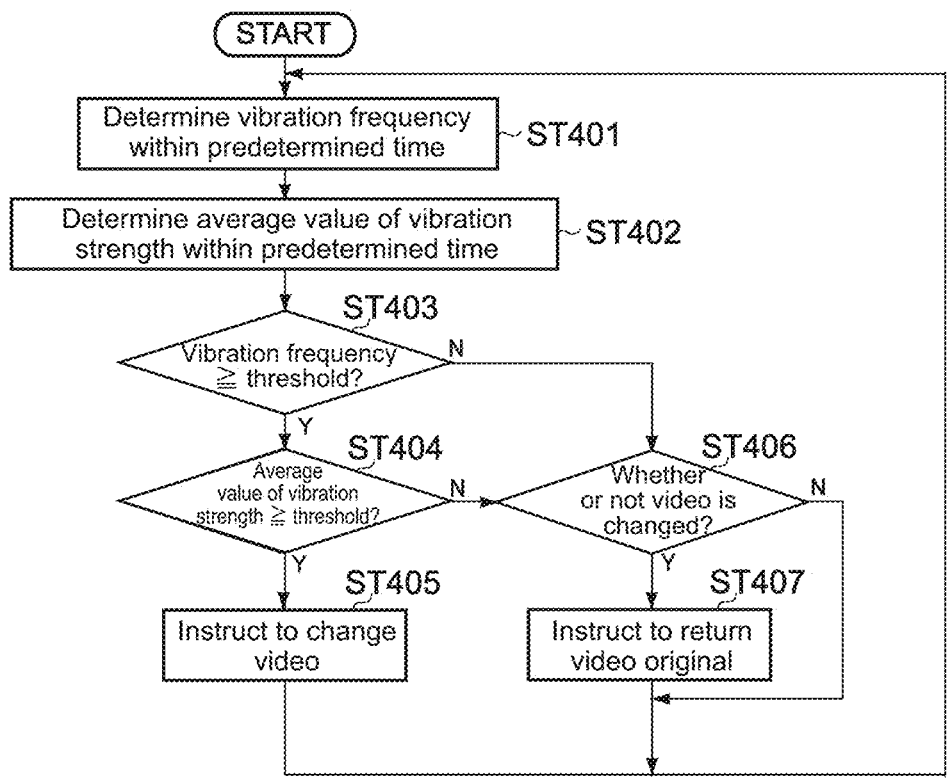
FIG. 6 A flowchart showing processing according to a third embodiment.

FIG. 6 is a flowchart showing the processing according to the third embodiment.

First, the control section 31 of the controller 30 determines the vibration frequency of the vibration section 35 within the predetermined time (Step 401). Here, the predetermined time refers to a time from the predetermined time before the current time (for example, several tens seconds to several minutes before) to the current time.

Next, the control section 31 of the controller 30 calculates an average value of the vibration strength of the vibration section 35 within the predetermined time (Step 402). Here, the predetermined time refers to the time from the predetermined time before the current time (for example, several tens seconds to several minutes before) to the current time.

Next, the control section 31 of the controller 30 determines whether or not the vibration frequency of the vibration section 35 within the predetermined time exceeds the predetermined threshold (Step 403). In a case where the vibration frequency of the vibration section 35 exceeds the predetermined threshold (YES in Step 403), the control section 31 of the controller 30 determines whether or not an average value of the vibration strength of the vibration section 35 within the predetermined time exceeds the predetermined threshold (Step 404).

In a case where the average value of the vibration strength of the vibration section 35 exceeds the predetermined threshold (YES in Step 404), the control section 31 of the controller 30 instructs the game apparatus body 20 to change the video (Step 405). In this case, the game apparatus body 20 temporarily changes the video in accordance with the instruction.

Here, the case in which the vibration frequency of the vibration section 35 within the predetermined time exceeds the predetermined threshold and the average value of the vibration strength of the vibration section 35 within the predetermined time exceeds the predetermined threshold refers the case in which the controller 30 is often vibrated and the vibration is strong. In such a case, the user gets used to the strong vibration and feels the vibration weaker than the actual vibration.

Figure 7:
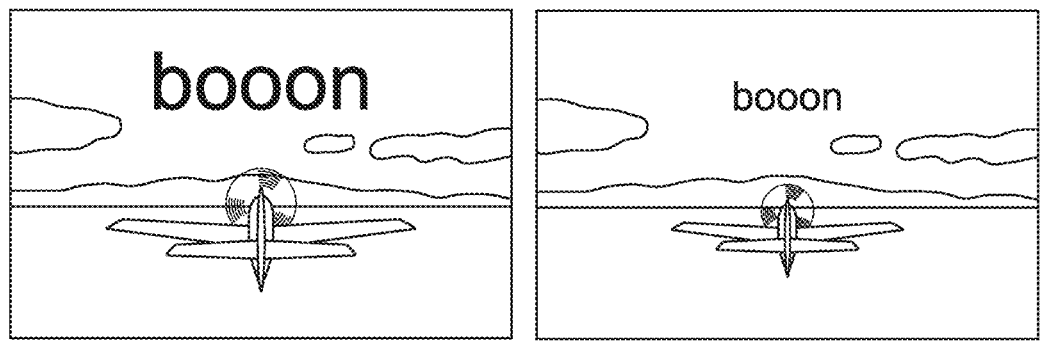
FIG. 7 Diagrams showing an example when a video is changed.
Figure 8:
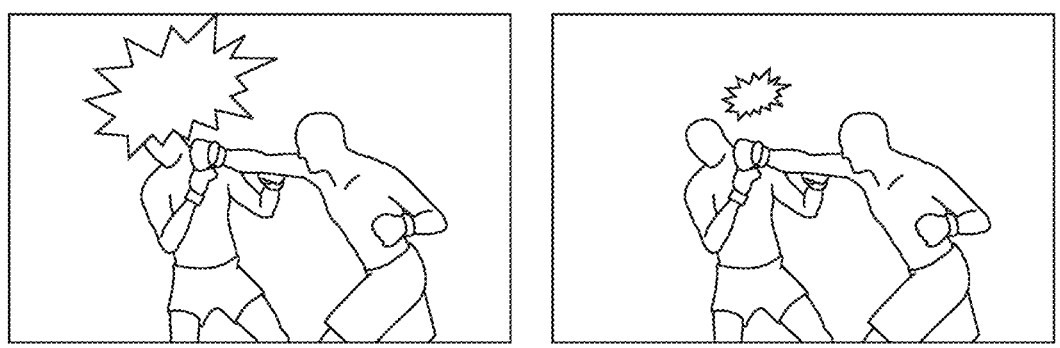
FIG. 8 Diagrams showing an example when a video is changed.

FIG. 7 and FIG. 8 show examples when the videos are changed. FIG. 7 shows videos that an airplane is flying. An original video is at a left side of FIG. 7 and a video after changing is at a right side of FIG. 7. As shown in FIG. 7, a size of the airplane (object) in the video after changing is smaller than a size of the airplane in the original video.

FIG. 8 shows videos that a boxer punches an opponent. An original video is at a left side of FIG. 8 and a video after changing is at a right side of FIG. 8. As shown in FIG. 8, a magnitude of an action by the boxer (object) in the video after changing is smaller than a magnitude of the action by the boxer in the original video.

In Step 405, when the instruction of changing the video is issued, the videos shown at the right side of FIG. 7 and at the right side of FIG. 8 are displayed on a screen of the display section 14.

In Step 403, in a case where the vibration frequency of the vibration section 35 is lower than the predetermined threshold (NO in Step 403), the control section 31 of the controller 30 proceeds to Step 406. Similarly, in Step 404, in a case where the average value of the vibration strength of the vibration section 35 is lower than the predetermined threshold (NO in Step 404), the control section 31 of the controller 30 proceeds to Step 406.

In Step 406, the control section 31 of the controller 30 determines whether or not the video is changed at present. In a case where the video is changed at present (YES in Step 406), the control section 31 of the controller 30 instructs the game apparatus body 20 to return the video to the original. The game apparatus body 20 returns the video to the original in accordance with the instruction.

In Step 407, when the instruction to return the video to the original is issued, the video shown at the left side of FIG. 7 or the left side of FIG. 8 is displayed on the screen of the display section 14.

According to the third embodiment, in a case where the user gets used to the strong vibration and feels that the vibration is weaker than the actual vibration strength, the videos are changed, e.g., the size of the airplane is reduced and the action by the boxer is reduced. Accordingly, it can be prevent the user from feeling strange.

Fourth Embodiment

Next, a fourth embodiment of the present technology will be described.

As described above, in a case where the controller 30 is often vibrated and the vibration is strong, the user gets used to the strong vibration and becomes insensitive. The user may feel that the vibration is weaker than the actual vibration strength.

According to the fourth embodiment, in order to return a sense of the user who gets used to the strong vibration and becomes insensitive to an original sensitive sense, processing of changing a scene of the video in accordance with the vibration frequency and the vibration strength (i.e., in accordance with the vibration) is executed.

Figure 9:
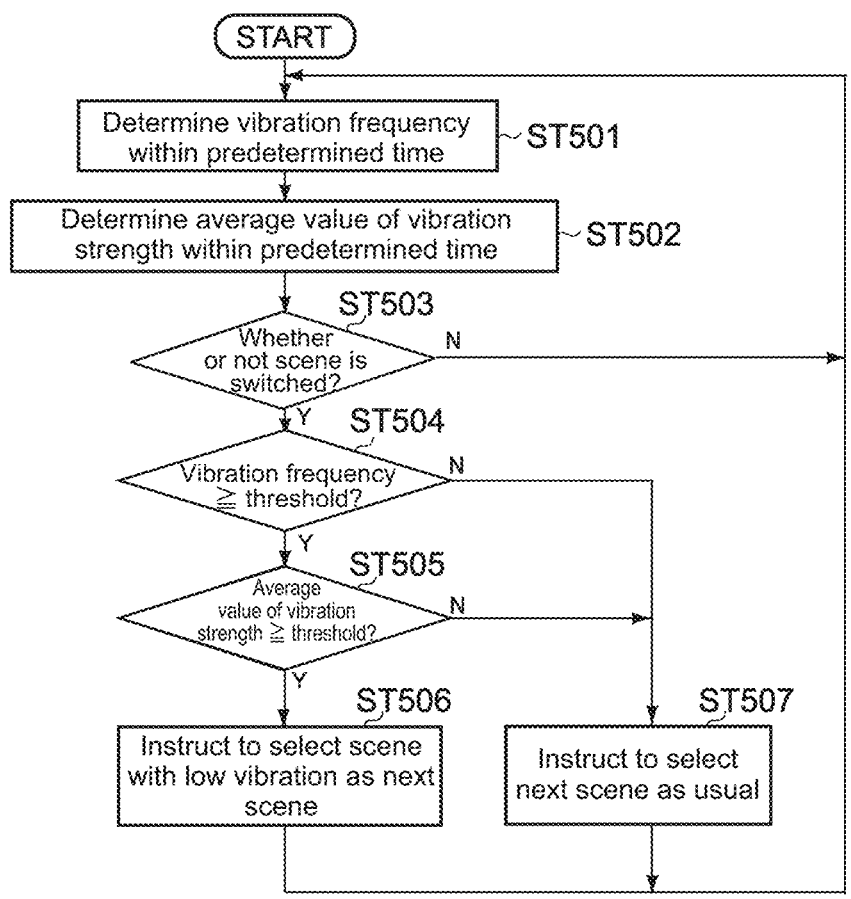
FIG. 9 A flowchart showing processing according to a fourth embodiment.

FIG. 9 is a flowchart showing the processing according to the fourth embodiment.

First, the control section 31 of the controller 30 determines the vibration frequency of the vibration section 35 within the predetermined time (Step 501). Here, the predetermined time refers to the time from the predetermined time before the current time (for example, several tens seconds to several minutes before) to the current time.

Next, the control section 31 of the controller 30 calculates an average value of the vibration strength of the vibration section 35 within the predetermined time (Step 502). Here, the predetermined time refers to the time from the predetermined time before the current time (for example, several tens seconds to several minutes before) to the current time.

Next, the control section 31 of the controller 30 determines whether or not it is the timing to switch the scene of the video at present (Step 503). At present, if it is not the timing to switch the scene of the video (NO in Step 503), the control section 31 of the controller 30 returns to Step 501.

On the other hand, if it is the timing to switch the scene of the video at present (YES in Step 503), the control section 31 of the controller 30 determines whether or not the vibration frequency of the vibration section 35 within the predetermined time exceeds the predetermined threshold (Step 504).

If the vibration frequency of the vibration section 35 exceeds the predetermined threshold (YES in Step 504), the control section 31 of the controller 30 determines whether or not the average value of the vibration strength of the vibration section 35 within the predetermined time exceeds the predetermined threshold (Step 505).

If the average value of the vibration strength of the vibration section 35 exceeds the predetermined threshold (YES in Step 505), the control section 31 of the controller 30 instructs the game apparatus body 20 to select the scene with the low vibration frequency as a next scene of the video (Step 506). Note that, in Step 506, the control section 31 of the controller 30 may instruct to select the scene with weak vibration strength.

Figure 10:
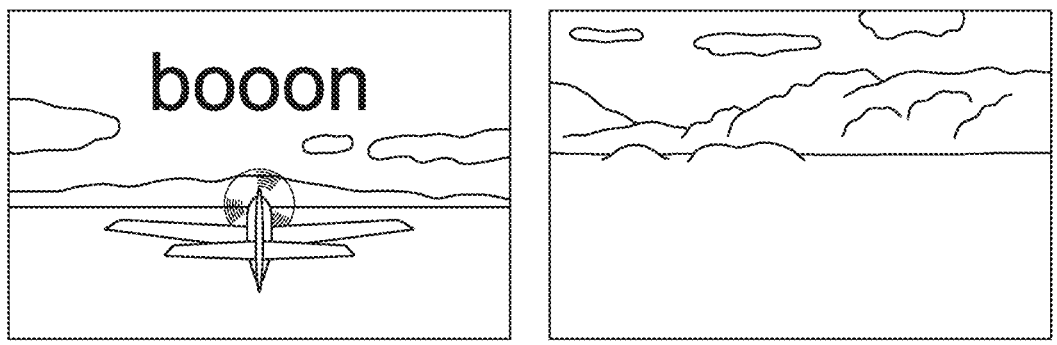
FIG. 10 Diagrams showing an example that a scene with a low vibration frequency as a next scene of a video is selected.

FIG. 10 is diagrams showing an example that the scene with the low vibration frequency as the next scene of the video is selected. At a left side of FIG. 10, a previous scene of the video is shown, and at a right side of FIG. 10, the next scene of the video is shown.

The previous scene shown at the left side of FIG. 10 is a scene in which an airplane flies and the vibration frequency is high. The next scene shown at the right side of FIG. 10 is a rest scene and the vibration frequency is low (entirely no vibration occurs). Contents and a length of the rest scene may be changed in accordance with the vibration frequency within the predetermined time, the average value of the vibration strength, and the like.

In Step 504, if the vibration frequency of the vibration section 35 is lower than the predetermined threshold (NO in Step 504), the control section 31 of the controller 30 proceeds to Step 507. Similarly, in Step 505, if the average value of the vibration strength of the vibration section 35 is lower than the predetermined threshold (NO in Step 505), the control section 31 of the controller 30 proceeds to Step 507.

In Step 507, the control section 31 of the controller 30 instructs the game apparatus body 20 to select the next scene as usual. In accordance with the instruction, the game apparatus body 20 selects the next scene as usual. In this case, the rest scene shown at the right side of FIG. 10 is not displayed on the screen of the display section 14.

According to the fourth embodiment, in a case where the user gets used to the strong vibration and feels that the vibration is weaker than the actual vibration, the scene of the video is changed and the scene with the low vibration frequency (or low vibration strength) is selected as the next scene. Accordingly, the sense of the user who gets used to the strong vibration and becomes insensitive to the original sensitive sense can be returned to the original sensitive sense.

According to the fourth embodiment, the case is described that in order to return the sense of the user who gets used to the strong vibration and becomes insensitive to the original sensitive sense, the scene with the low vibration frequency (or low vibration strength) is selected as the next scene. On the other hand, in a case where the next scene is such that the vibration frequency is high and the vibration is important, processing of preventing the sense of the user from becoming insensitive at present may be executed.

In this case, for example, if the vibration is not important in the scene at present, the vibration frequency of the scene at present is lowered and the vibration strength is lowered (i.e., the vibration is changed in accordance with the scene of the video).

Here, there may be a case that the control section 31 does not determine at present whether or not the next scene has the high vibration frequency and the vibration is important. For example, in a roll playing game or the like, the present scene may diverge into a plurality of scenes such as a scene A in which the vibration is high and important and a scene B in which the vibration is low and unimportant. In this case, it is not determined whether or not the next scene is the scene A in which the vibration is high and important and the scene B in which the vibration is low and unimportant.

Accordingly, in such a case, it may be assumed that which of the scene A and the scene B is more likely selected by the user on the basis of the user information. By the assumption, if it is determined that the scene A is more likely to be selected by the user, the vibration frequency of the present scene is lowered or the vibration strength is weakened.

Fifth Embodiment

Next, a fifth embodiment of the present technology will be described.

Figure 11:
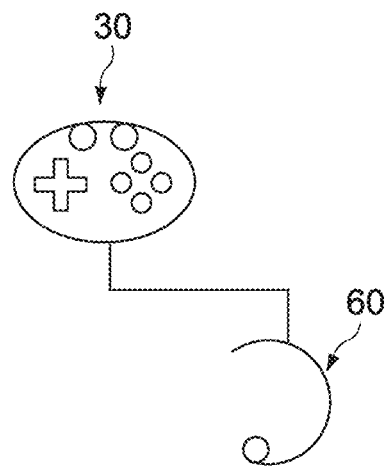
FIG. 11 A diagram showing a microphone for chat according to a fifth embodiment.

FIG. 11 is a diagram showing a microphone for chat 60 according to the fifth embodiment.

The microphone for chat 60 shown in FIG. 11 is a microphone of a type used by hanging on an ear and is connected to the controller 30 with wire. The microphone for chat 60 collects a voice of a user and converts the collected voice to an electric signal.

The microphone for chat 60 is used for chatting with other users that play the game together when the users play a communication game, etc. In addition, the microphone for chat 60 may be used for inputting a command in the game.

For example, in the case of the microphone for chat 60 shown in FIG. 11, if the controller 30 vibrates, the microphone for chat 60 may also vibrate in accordance with the vibration of the controller 30. In this case, if the vibration strength is strong, a vibration sound may become a noise and may overlap with a signal output from the microphone for chat 60.

Accordingly, the control section 31 of the controller 30 may weaken the vibration strength when the microphone for chat 60 is used as compared with when the microphone for chat 60 is not used. With this, it is possible to prevent the noise from overlapping with the signal output from the microphone for chat 60.

Note that determination whether or not the voice of the user is corrected (whether or not microphone is used) can be detected by VAD (Voice Activity Detection). In addition, when the vibration strength is weaken, a frequency component, e.g., 100 Hz or more, of vibration frequency components may be lowered taking the human audible range into consideration.

Here, for example, it is assumed that the user performs a battle communication game and does a chat with an ally user who plays the communication game together by using the microphone for chat 60. In this case, the user may be occupied by chatting with the ally and may not be aware that a battle opponent, i.e., an enemy, is approaching.

Thus, for example, in a case where the game is in an critical phase that the enemy is approaching, processing that the vibration strength is strengthened may be executed.

In this case, when the microphone for chat 60 is used, the control section 31 of the controller 30 makes the vibration strength stronger than that when the microphone for chat 60 is not used. This allows the user who is occupied by chatting to be aware that the game is in the critical phase that the enemy is approaching. Note that in a case where the vibration occurs in order to notice the enemy approaching, the vibration strength may be arbitrarily set by the user who manipulates the enemy.

As understood from the above description, it is enough that the control section 31 of the controller 30 can change the vibration strength in accordance with whether or not the microphone for chat 60 is used.

Sixth Embodiment

Next, a sixth embodiment of the present technology will be described.

Here, if the vibration section 35 vibrates, the vibration sound may be generated and the user may dislike the vibration sound.

For example, if the sound strength of the game is weak, the user may be concerned about the vibration sound. On the other hand, if the sound strength of the game is strong, the user may not be concerned much about the vibration sound which is rather somewhat strong. According to the sixth embodiment, this relationship is used such that strength of a vibration sound is changed in accordance with sound strength of the game.

Figure 12:
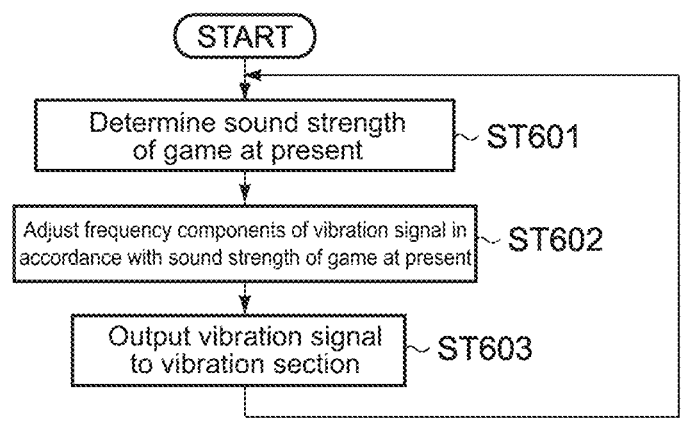
FIG. 12 A flowchart showing processing according to a sixth embodiment.

FIG. 12 is a flowchart showing the processing according to the sixth embodiment.

First, the control section 31 of the controller 30 determines the sound strength of the game at present (Step 601). The processing at this time is the same as that in Step 105 of FIG. 3.

Next, the control section 31 of the controller 30 adjusts frequency components of a vibration signal output to the vibration section 35 in accordance with the sound strength of the game at present (Step 602). At this time, the control section 31 of the controller 30 adjusts the frequency components of the vibration signal such that the weaker the sound strength of the game is, the fewer the frequency components within a predetermined range of the human audible range (20 Hz to 20 kHz) are.

In order to adjust the frequency components of the vibration signal, for example, a low pass filter and a band pass filter are used. Specifically, the low pass filter and the band pass filter cut the frequency components within the predetermined range and the frequency components within the predetermined range are reduced.

A frequency range to be cut (predetermined range) is the frequency range of the vibration sound that the user is concerned about. Here, the human audible range is 20 Hz to 20 kHz, but it is also considered that the frequency of the vibration sound that the user is concerned about is not fully matched with the human audible range. For example, it is also considered that the user is not concerned about the vibration sound within the range of 20 Hz to 100 Hz, 20 Hz to 200 Hz, and the like.

Accordingly, the range of the frequency to be cut (predetermined range) is set, for example, to 100 Hz or more, 200 Hz or more, and the like. In this case, for example, a cut-off frequency of the low pass filter is set to 100 Hz, 200 Hz, etc. The low pass filter is configured to be capable of cutting the frequency of 100 Hz or more, 200 Hz or more.

The width of the frequency range to be cut (predetermined range) may be set in accordance with the sound strength of the game. For example, the frequency range to be cut may be set such that the weaker the sound strength of the game is, the wider the width thereof is.

Note that the width of the frequency range to be cut (predetermined range) may be matched with the human audible range (20 Hz to 20 k Hz). In this case, the frequency components within the human audible range may be cut by the band pass filter.

In addition, depending on a structure of a housing of the controller 30, characteristics of the vibration sound generated by vibrating the vibration section 35 may be changed. Accordingly, the width of the frequency range to be cut (predetermined range) may be different for the type of the controller 30.

Figure 13:
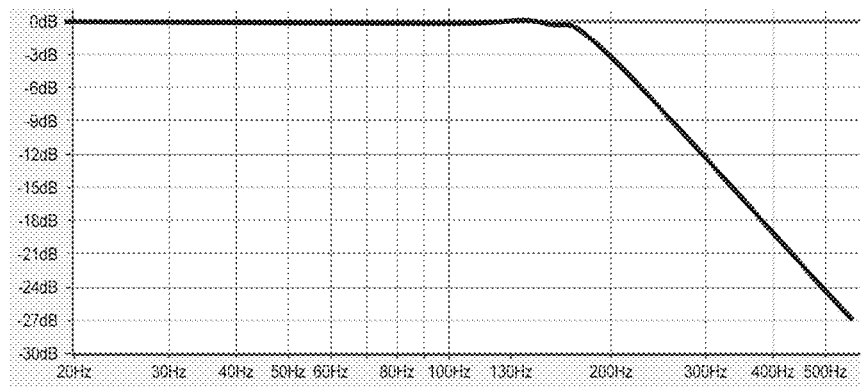
FIG. 13 Diagrams showing an example of each vibration signal.
Figure 13:
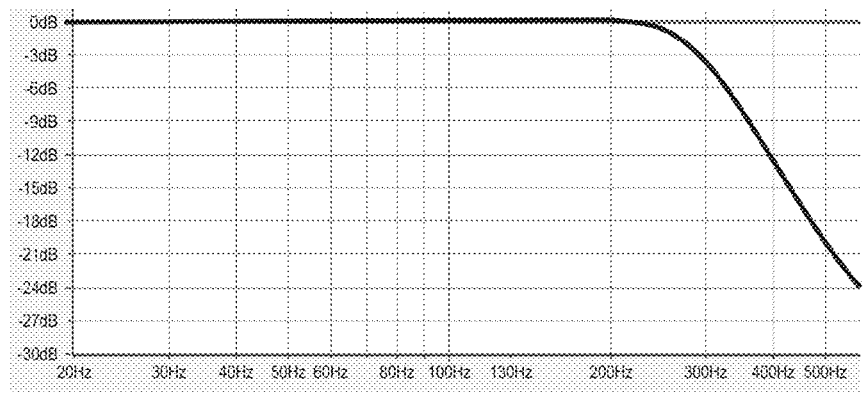
Figure 13:
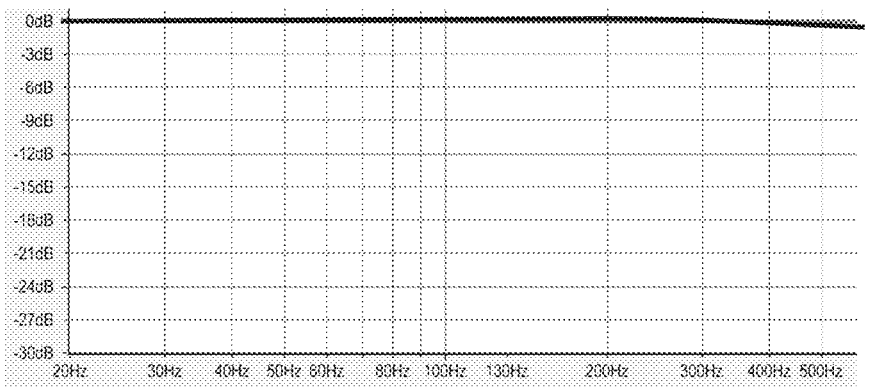

FIG. 13 are diagrams showing an example of each vibration signal. Three diagrams shown in FIG. 13 show the examples of each vibration signal when the sound strength of the game at present is 0, 50, or 100 in order from the top. Note that, FIG. 13 shows that the the frequency components of the vibration signal are adjusted by the low pass filter having the cut-off frequency set to 200 Hz.

With reference to a bottom diagram of FIG. 13, in a case where the sound strength of the game at present is 100 (maximum value), the frequency components of the vibration signal are not adjusted. In other words, in a case where the sound strength of the game is strong, the frequency components are not adjusted, as the user is not concerned about the vibration sound which is rather strong.

With reference to a middle diagram of FIG. 13, in a case where the sound strength of the game at present is 50, the vibration signal is passed through the low pass filter (cut-off frequency of 200 Hz) to cut the frequency components of 200 Hz or more. In other words, in a case where the sound strength of the game at present is 50, the frequency components of 200 Hz or more are cut, as the user may be concerned about the vibration sound.

With reference to a top diagram of FIG. 13, in a case where the sound strength of the game at present is 0, the vibration signal is passed through the low pass filter (cut-off frequency of 200 Hz) to cut the frequency components of 200 Hz or more. Incidentally, in a case where the sound strength of the game is 0, the low pass filter is applied stronger than in a case where the sound strength of the game is 50. Specifically, in a case where the sound strength of the game at present is 0, the user becomes sensitive to the vibration sound. Thus, the frequency components of 200 Hz or more are strongly cut.

Returning to FIG. 12, after the frequency components of the vibration signal is adjusted, the control section 31 of the controller 30 outputs the vibration signal in which the frequency components are adjusted to the vibration section 35 (Step 603).

According to the sixth embodiment, the strength of the vibration sound generated by vibrating the vibration section 35 is changed in accordance with the sound strength of the game. In particular, according to the sixth embodiment, the vibration frequency of the vibration section 35 is changed such that the weaker the sound strength of the game is, the fewer the frequency components within a predetermined range of the human audible range (20 Hz to 20 kHz) are. This allows the user to be aware of the vibration sound.

Here, there are roughly divided into four methods of changing the strength of the vibration sound in accordance with the sound strength of the game. Note that two or more methods of the four methods (1) to (4) may be combined.

(1) The vibration magnitude of the vibration section 35 is changed in accordance with the sound pressure of the game sound, (2) the vibration frequency of the vibration section 35 is changed in accordance with the sound pressure of the game sound, (3) the vibration magnitude of the vibration section 35 is changed in accordance with the frequency of the game sound, and (4) the vibration frequency of the vibration section 35 is changed in accordance with the frequency of the game sound.

Incidentally, in the cases of the (2) and (4), a voice coil motor is typically used as the vibration section 35 (because the vibration frequency is easily controlled). Note that, in the cases of the (1) and (3), as the vibration section 35, the voice coil motor may be used or the eccentric motor may be used.

Similar to the first embodiment, also in the sixth embodiment, the environmental sound may be taken into consideration. In addition, similar to the fifth embodiment, also in the sixth embodiment, it may be considered whether or not it is chatting. It should be appreciated that the respective embodiments described in the present technology may be combined each other.

Various Modifications

For example, in order to determine whether or not the vibration is appropriate, the controller 30, etc. may include a sensor (camera, acceleration sensor, brain wave sensor, or the like) that measures a physical change (change in sweating, change in hear rate, change in brain wave, change in facial expression) of the user based on the vibration.

In this case, the control section 31 of the controller 30 may acquire information about the physical change of the user from the sensor and change a value for changing the vibration strength (for example, ratio r, correction factor k1, correction factor k2, or the like) in accordance with the physical change of the user. This allows the vibration strength to be more adequate strength.

The above mainly describes the case that the control section 31 of the controller 30 executes a variety of processing. On the other hand, the processing may be executed by the game apparatus body 20, the output apparatus 10, or the server apparatus on the network.

In the above description, the game apparatus 50 is illustrated as the example to which the present technology is applied. On the other hand, the present technology is applicable to a variety of electronic apparatuses such as a mobile phone (including smartphone), a handheld game console, a portable audio player, a tablet PC (PC: personal computer), and a virtual reality apparatus.

In the above description, the game system 100 is illustrated as the example to which the present technology is applied. On the other hand, the present technology is applicable to any system as long as the system includes three components, typically, a video, a sound, and vibration. For example, the present technology is applicable to a virtual reality system.

The present technology may also have the following structures.

(1) An information processing apparatus, including:
a control section that determines a type of a sound output section outputting a sound and changes vibration strength of a vibration section in accordance with the determined type of the sound output section.

(2) The information processing apparatus according to (1), in which
the control section changes the vibration strength of the vibration section in accordance with strength of the sound output from the sound output section.

(3) The information processing apparatus according to (2), in which
the control section changes the vibration strength such that the stronger the sound strength is, the stronger the vibration strength is or the weaker the sound strength is, the weaker the vibration strength is.

(4) The information processing apparatus according to (2), in which
the control section changes the vibration strength such that the stronger the sound strength is, the weaker the vibration strength is or the weaker the sound strength is, the stronger the vibration strength is.

(5) The information processing apparatus according to any one of (1) to (4), in which
the control section changes strength of the sound output from the sound output section in accordance with the vibration strength of the vibration section.

(6) The information processing apparatus according to (2), in which
the control section changes the strength of the sound output from the sound output section in accordance with the changed vibration strength.

(7) The information processing apparatus according to (6), in which
the control section changes the sound strength when the changed vibration strength reaches a maximum value of vibration.

(8) The information processing apparatus according to any one of (1) to (7), in which
the control section changes the vibration strength of the vibration section in accordance with sound strength of an environmental sound.

(9) The information processing apparatus according to any one of (1) to (8), in which
the control section changes strength of the sound output from the sound output section in accordance with sound strength of an environmental sound.

(10) The information processing apparatus according to any one of (1) to (9), in which
the control section changes a video in accordance with vibration of the vibration section.

(11) The information processing apparatus according to (10), in which
the control section changes a size of an object or a magnitude of an action of the object within the video in accordance with the vibration of the vibration section.

(12) The information processing apparatus according to any one of (1) to (11), in which
the control section changes a scene of a video in accordance with vibration of the vibration section.
(13) The information processing apparatus according to any one of (1) to (12), in which
the control section changes vibration of the vibration section in accordance with a scene of a video.
(14) The information processing apparatus according to any one of (1) to (13), in which
a microphone used for collecting a voice of a user vibrates in accordance with vibration of the vibration section, and
the control section changes the vibration strength in accordance with whether or not the microphone is used.
(15) The information processing apparatus according to any one of (1) to (14), in which
the control section acquires information about a physical change of a user based on vibration of the vibration section and changes a value for changing the vibration strength in accordance with the physical change of the user.
(16) The information processing apparatus according to any one of (1) to (15), in which
the control section changes strength of a vibration sound generated by vibration of the vibration section in accordance with strength of the sound output from the sound output section.
(17) The information processing apparatus according to any one of (1) to (16), in which
the vibration section is arranged on a vibrator, and
the control section acquires information about a state that the vibrator is held by a user and changes the vibration strength of the vibration section in accordance with the information about the state that the vibrator is held.
(18) The information processing apparatus according to any one of (1) to (17), in which
the control section acquires sensitivity information about strength of the sound output from the sound output section or sensitivity of the vibration strength of the vibration section and changes the vibration strength of the vibration section in accordance with the sensitivity information.
(19) An information processing method, including:
determining a type of a sound output section outputting a sound; and
changing vibration strength of a vibration section in accordance with the determined type of the sound output section.
(20) A program causing a computer to execute steps of:
determining a type of a sound output section outputting a sound; and
changing vibration strength of a vibration section in accordance with the determined type of the sound output section.

REFERENCE SIGNS LIST

10 output apparatus
13 display section
14 speaker
20 game apparatus body
30 controller
31 control section
33 operation section
35 vibration section
36 microphone
40 headphone
50 game apparatus
60 microphone for chat
100 the game system

The invention claimed is:

1. An information processing device, comprising:
an eccentric motor configured to vibrate corresponding to reproduction of content, wherein the eccentric motor is on a vibrator;
a microphone configured to detect a sound strength of an environmental sound; and
a central processing unit (CPU) configured to:
acquire information associated with a state of the vibrator, wherein
the state of the vibrator indicates that the vibrator is held by a user, and
the information associated with the state of the vibrator includes at least one of a posture of the vibrator and a force of gripping the vibrator by the user;
determine a type of a sound output device that outputs a sound signal, wherein the sound signal is different from the environmental sound; and
control the eccentric motor to change a vibration strength of the eccentric motor, wherein the vibration strength of the eccentric motor is changed based on the type of the sound output device, the information associated with the state of the vibrator, and the sound strength of the environmental sound.

2. The information processing device according to claim 1, wherein the CPU is further configured to control the eccentric motor to change the vibration strength of the eccentric motor based on a strength of the sound signal.

3. The information processing device according to claim 2, wherein the vibration strength of the eccentric motor is changed such that:
stronger the strength of the sound signal is, stronger the vibration strength of the eccentric motor is, or
weaker the strength of the sound signal is, weaker the vibration strength of the eccentric motor is.

4. The information processing device according to claim 2, wherein the vibration strength of the eccentric motor is changed such that:
stronger the strength of the sound signal is, weaker the vibration strength of the eccentric motor is, or
weaker the strength of the sound signal is, stronger the vibration strength of the eccentric motor is.

5. The information processing device according to claim 1, wherein the CPU is further configured to control the sound output device to change a strength of the sound signal based on the sound strength of the environmental sound.

6. The information processing device according to claim 1, wherein
the CPU is further configured to control a display screen to change a scene of a video displayed on the display screen, and
the scene of the video is changed based on the vibration strength of the eccentric motor.

7. The information processing device according to claim 1, wherein
the microphone is further configured to vibrate based on the vibration strength of the eccentric motor, and
the CPU is further configured to control the eccentric motor to change the vibration strength of the eccentric motor based on a usage state of the microphone.

8. The information processing device according to claim 1, wherein the CPU is further configured to:
acquire information about a change in a user physical state, wherein the information is acquired based on the vibration of the eccentric motor; and
change a specific value associated with the vibration strength of the eccentric motor based on the acquired information; and
control the eccentric motor to change the vibration strength of the eccentric motor based on the change in the specific value.

9. The information processing device according to claim 1, wherein
the CPU is further configured to control the eccentric motor to change a strength of a vibration sound generated by the vibration of the eccentric motor, and
the strength of the vibration sound is changed based on a strength of the sound signal.

10. The information processing device according to claim 1, wherein the CPU is further configured to:
acquire one of sensitivity information of a strength of the sound signal output from the sound output device or sensitivity information of the vibration strength of the eccentric motor; and
control the eccentric motor to change the vibration strength of the eccentric motor based on one of the sensitivity information of the strength of the sound signal or the sensitivity information of the vibration strength.

11. The information processing device of claim 1, wherein
the microphone is further configured to detect the sound strength of the environmental sound at a position of the sound output device, and
the CPU is further configured to:
determine a spatial positional relationship among a user position, the position of the sound output device, and a position of a sound generating source of the environmental sound;
determine a sound strength of the environmental sound at the user position based on:
the sound strength of the environmental sound at the position of the sound output device, and
the spatial positional relationship; and
change the vibration strength of the eccentric motor based on the sound strength of the environmental sound at the user position.

12. The information processing device of claim 1, wherein the CPU is further configured to:
generate a vibration signal to control the eccentric motor;
adjust frequency components of the vibration signal based on a strength of the sound signal; and
control the eccentric motor based on the vibration signal with adjusted frequency components.

13. An information processing method, comprising:
controlling an eccentric motor to vibrate corresponding to reproduction of content, wherein the eccentric motor is on a vibrator;
detecting a sound strength of an environmental sound;
acquiring information associated with a state of the vibrator, wherein
the state of the vibrator indicates that the vibrator is held by a user, and
the information associated with the state of the vibrator includes at least one of a posture of the vibrator and a force of gripping the vibrator by the user;
determining a type of a sound output device that outputs a sound signal, wherein the sound signal is different from the environmental sound; and
controlling the eccentric motor to change a vibration strength of the eccentric motor, wherein the vibration strength of the eccentric motor is changed based on the type of the sound output device, the information associated with the state of the vibrator, and the sound strength of the environmental sound.

14. A non-transitory computer-readable medium having stored thereon computer-executable instructions which, when executed by a computer, cause the computer to execute operations, the operations comprising:
controlling an eccentric motor to vibrate corresponding to reproduction of content, wherein the eccentric motor is on a vibrator;
acquiring information associated with a state of the vibrator, wherein
the state of the vibrator indicates that the vibrator is held by a user, and
the information associated with the state of the vibrator includes at least one of a posture of the vibrator and a force of gripping the vibrator by the user;
detecting a sound strength of an environmental sound;
determining a type of a sound output device that outputs a sound signal, wherein the sound signal is different from the environmental sound; and
controlling the eccentric motor to change a vibration strength of the eccentric motor, wherein the vibration strength of the eccentric motor is changed based on the type of the sound output device, the information associated with the state of the vibrator, and the sound strength of the environmental sound.

* * * * *